US010986769B2

(12) United States Patent
Ochampaugh et al.

(10) Patent No.: US 10,986,769 B2
(45) Date of Patent: Apr. 27, 2021

(54) LOW DUST POWDERED SEED TREATMENT

(71) Applicant: Agrilead, Inc., Russell, KS (US)

(72) Inventors: Jeff Ochampaugh, Russell, KS (US); Andrew Ochampaugh, Russell, KS (US)

(*) Notice: Subject to any disclaimer, the term of this patent is extended or adjusted under 35 U.S.C. 154(b) by 274 days.

(21) Appl. No.: 16/140,306

(22) Filed: Sep. 24, 2018

(65) Prior Publication Data
US 2019/0090412 A1 Mar. 28, 2019

Related U.S. Application Data

(60) Provisional application No. 62/735,459, filed on Sep. 24, 2018, provisional application No. 62/591,460, filed on Nov. 28, 2017, provisional application No. 62/561,819, filed on Sep. 22, 2017.

(51) Int. Cl.
*A01C 1/06* (2006.01)
*A01C 1/04* (2006.01)
*A01N 25/10* (2006.01)

(52) U.S. Cl.
CPC ............... *A01C 1/06* (2013.01); *A01C 1/046* (2013.01); *A01N 25/10* (2013.01)

(58) Field of Classification Search
CPC .......... A01C 1/046; A01C 1/06; A01N 25/00; A01N 25/08; A01N 25/10
USPC ............... 47/57.6, 58.1 SE, DIG. 9; 504/100
See application file for complete search history.

(56) References Cited

U.S. PATENT DOCUMENTS

| 7,141,265 | B2 * | 11/2006 | Sakuma | A21D 2/16 |
| | | | | 426/601 |
| 8,084,393 | B1 * | 12/2011 | Kresge | A01N 25/00 |
| | | | | 504/100 |
| 9,179,667 | B1 * | 11/2015 | Kresge | A01N 25/00 |
| 2005/0118212 | A1 | 6/2005 | Emig | |
| 2006/0233738 | A1 | 10/2006 | Miyata et al. | |
| 2008/0193393 | A1 * | 8/2008 | Dayan | A61K 47/12 |
| | | | | 424/59 |
| 2011/0190121 | A1 * | 8/2011 | Assmann | A01N 51/00 |
| | | | | 504/100 |
| 2012/0115911 | A1 * | 5/2012 | Ochampaugh | A01C 1/08 |
| | | | | 514/341 |
| 2014/0274685 | A1 * | 9/2014 | Huang | A01N 25/00 |
| | | | | 504/100 |
| 2016/0143272 | A1 * | 5/2016 | Ochampaugh | A01N 25/24 |
| | | | | 504/358 |
| 2016/0345575 | A1 | 12/2016 | Wiand et al. | |

FOREIGN PATENT DOCUMENTS

| WO | 9819652 | A1 | 5/1998 |
| WO | 2017059197 | A1 | 4/2017 |
| WO | 2019060852 | A2 | 3/2019 |

OTHER PUBLICATIONS

"International Search Report and Written Opinion received for PCT Application No. PCT/US2018/052485" dated Apr. 19, 2019, 11 pages.
"International Search Report for PCT received for PCT Application No. PCT/US2018/052485" dated Apr. 19, 2019, 3 pages.

* cited by examiner

*Primary Examiner* — Peter M Poon
*Assistant Examiner* — Danielle A Clerkley
(74) *Attorney, Agent, or Firm* — Kutak Rock LLP

(57) ABSTRACT

A powdered lubricant composition that minimizes fugitive dust and a method of treating seeds with dry lubricant that minimizes fugitive dust. Addition of oil powder to dry lubricants is found to minimize fugitive dust created during the application of the dry lubricant. Mica coated titanium dioxide is an ideal dry lubricant for combining with oil powder.

19 Claims, No Drawings

LOW DUST POWDERED SEED TREATMENT

This application claims priority pursuant to 35 U.S.C. 119(e) to U.S. Provisional Patent Application Ser. No. 62/735,459 filed Sep. 24, 2018, U.S. Provisional Patent Application Ser. No. 62/591,460 filed Nov. 28, 2017, and U.S. Provisional Patent Application No. 62/561,819 filed Sep. 22, 2017, the entire disclosure of which is incorporated herein by reference.

FIELD OF THE INVENTION

The present invention relates generally to the application of dry powdered seed treatment used to enhance seed cosmetics and improve treated seed flow and plantability while minimizing fugitive dust during application of the powdered treatment to the seed. More specifically, the present invention involves the discovery of a new powdered seed treatment composition that lubricates seeds while effectively minimizing fugitive dust.

BACKGROUND OF THE INVENTION

A common practice in modern agriculture is to treat crop seeds prior to planting with pesticides that protect the seeds from disease and insects and other pests. More recently, the use of biological agents to protect plants and promote seedling growth has also become a more common practice. These practices have intensified over the past 20 years as better crop seed with advanced genetics to improve yield have increased in value and thus the importance for producers to be successful in establishing the crop the first time the seeded is planted. Further, seeding equipment (planters and seed drills) have evolved with new levels of precision to singulate and plant seeds precisely with respect to depth, spacing, population, and even seed orientation within the soil. The new seeding devices involve many mechanical and air driven complexities that along with electronic automation work together to accomplish the desired seeding performance.

As the practice of developing advanced seed treating methods, seed genetics, and precision seeding methods have evolved, so have the formulations of the seed treatment products designed to work effectively within the mechanical and biological limitations of the seed treating and seed planting systems used. It is well understood within the industry that pesticide/biological treated seeds flow and handle differently than untreated seed. Typically treated seed does not flow as well through seeding/planting devices and can build residues on seed handling and planting equipment surfaces.

Accordingly, the industry has long accepted the use of seed lubricants to improve seed flow and plantibility. The most well-known seed lubricants are talc and graphite. Other dry lubricants are also known to decrease wear on seeding mechanisms. These lubricants are applied dry and mixed onto the seed after any liquid seed treatments have been applied. The lubricant can be applied either shortly after liquid seed treatments have been applied or in the field at the time of planting before the seed is loaded into the planting and seeding systems.

The key to seed lubrication performance is even coating of the dry lubricant on the seed. Adequate coating and coverage on the seed is challenging for most grower/operators in the field. Because of this issue, commercial seed care operators who treat seed with the liquid (e.g., pesticides, nutrients, or plant growth promoters) seed treatments have begun to apply dry seed lubricants immediately following liquid pesticide seed treatment while the seed remains in the liquid seed treatment applicator. This has been made possible with the use of improved dry seed lubricants which deliver effective seed lubrication performance at lower use rates than graphite and talc. For example, farmer applied talc at the time of planting in the field often requires 2-4 ounces per 50 lbs. of seed, the new low rate lubricants may perform as well or better at 0.25 to 0.5 ounces per 50 lbs. of seed when applied correctly with good coverage on the seed which can be accomplished with commercial seed treating equipment.

Commercially treated seed with dry lubricant application immediately following liquid seed treatment application eliminates the need for the farmer growers to apply the lubricant in the field and performance is typically much better with new lower rate powders commercially applied.

Particularly, dry powdered seed treatment lubricants are often used to improve the flow and planting characteristics of seed that has been treated with a liquid seed treatment products. While dry powdered seed treatment products are traditionally applied by the farmer/grower in the field at the time of planting the seed, commercial seed care operators have begun adding dry powdered seed coating lubricants immediately following liquid seed treatment application. This commercial application has been made feasible by the use of specialty coated products such as very finely ground mica coated with a lubricating and cosmetic agent that shines the seed.

The new "coated" powders can be effectively applied in either the continuous flow treating systems or the batch seed treating systems, immediately following the liquid treatment application but while the seed is still within the applicator. For continuous flow treating systems the treatment zone is typically within the final third of the secondary mixing phase (polishing drum), after slurry based seed treatment has been distributed on the seed, but while treated seed remains in a post-treatment "tack" stage.

While the application of commercially applied seed lubricants has become widely accepted in recent years, especially in such crops as soybean and cotton, the operators of seed treating equipment who apply the dry lubricants must now contend with the fugitive dust within the facility and the nuisance and irritation of the dust to workers. Fugitive dust is a workplace hazard, which without mitigation or precautions causes serious health and safety ramifications for workers.

Of particular concern is particulate matter air pollution comprised of fine inhalable particles, with diameters that are generally 2.5 micrometers and smaller. These particles are small enough to get deep into workers lungs. Fine inhalable particles also cause visibility issues.

The fugitive dust problem in commercial seed care operation facilities creates the need for expensive dust control and air exchange systems. Fugitive dust also has a negative impact on worker job satisfaction.

SUMMARY OF THE INVENTION

The present invention is a powdered lubricant composition that minimizes fugitive dust and a method of treating seeds with dry lubricant that minimizes fugitive dust.

DETAILED DESCRIPTION OF THE INVENTION

A composition comprising mica coated with titanium dioxide and oil powder has been found to be an effective seed lubricant that minimizes fugitive dust during application without disrupting the intended performance of the powdered lubricant in terms of seed flow and plantability.

An embodiment of the composition comprises a finely ground mica coated with titanium dioxide. Preferably, the finely ground mica coated with titanium dioxide has a particle size ranging from 10 to 60 microns. The composition of finely ground mica coated with titanium dioxide may have 50%, 55%, 60%, 65%, 70%, or 75% mica measured by weight. The composition of finely ground mica coated with titanium dioxide may have 25%, 30%, 35%, 40%, 45%, or 50% titanium dioxide measured by weight. Preferably, the composition of finely ground mica coated with titanium dioxide has 50%-75% mica and 25%-50% titanium dioxide (both measured by weight). The preferred finely ground mica coated with titanium dioxide is commercially available from Agrilead, Inc. and is referred to in the testing as PIXY.

An embodiment of the composition comprises oil powder made from natural oils. Preferably, the oil powder is produced with soybean or corn oil. While any oil powder may be used, it is preferable to use an oil powder produced without added heat during the encapsulation process. Some oil powders are produced by spray drying. The process of spray drying during the encapsulation process requires the use of intense heat. The preferred embodiment comprises oil powder made without the use of spray drying or intense heat. Such oil powders are commercially available. The embodiments that comprise oil powder made without spray drying or intense heat during the encapsulation process result in a greater reduction of fugitive dust than embodiments that comprise oil powder made by spray drying.

An embodiment of the composition comprises oil where that oil powder comprises maltodextrin. In an embodiment, the amount of maltodextrin in the oil powder ranges from 40%-60% by weight. In an embodiment, the amount of oil in the oil powder ranges from 40%-60% by weight. In one preferred embodiment the oil powder is comprised of 60% oil and 40% maltodextrin by weight. Preferably, the oil powder comprises 60% soybean oil and 40% maltodextrin by weight.

The composition may also include a flow agent or an anti-caking agent. Preferred flow agents include tricalcium phosphate, magnesium stearate, sodium bicarbonate, silicon dioxide, calcium silicate, magnesium silicate, and amorphous silica. A preferred embodiment comprises amorphous silica.

In one embodiment the composition comprises 70%-80% finely ground mica coated with titanium dioxide and 15%-30% oil powder (both measured by weight). In another embodiment the composition comprises 75% finely ground mica coated with titanium dioxide and 25% oil powder (both measured by weight). A preferred embodiment of the composition comprises 79% finely ground mica coated with titanium dioxide, 18.5% oil powder, and 2.5% flow agent (all measured by weight).

It was discovered that the full anti-pollution properties of the composition are present after the finely ground mica coated with titanium dioxide is blended with oil powder and then allowed to rest for at least 10 minutes before application or dispensing.

Examples

Fugitive dust was measured by an air quality monitor device. Specifically, the HHTP21 Particulate meter and particle counter manufactured by Omega was used to quantify the amount of fugitive dust in the air during testing. The device was set for testing the levels of particulate matter with size of 2.5 microns or less (PM2.5) suspended in a cubic meter of air space. The measurement is expressed as $\mu g/m^3$. Samples were measured at regular time intervals from a distance between 2-6 feet from the hopper or simulated augur.

The test batches were loaded into a hopper by pouring the batches into an empty hopper. The hopper was not activated during the test. The only dust created was from the act of pouring the batches into the hopper.

The air quality was measured before the batches were loaded into the hopper and at regular intervals thereafter.

Batch A was the commercially available PIXY product (finely ground mica coated with titanium dioxide). Batch B was the commercially available PIXY product mixed with oil powder where the oil powder consisted of 60% soybean oil and 40% maltodextrin.

| Air Quality Sample | Batch A (PIXY) | Batch B (PIXY with oil powder) |
|---|---|---|
| Sample 1 (0 sec) | 23 $\mu g/m^3$ | 21 $\mu g/m^3$ |
| Sample 2 (14 sec) | 397 $\mu g/m^3$ | 24 $\mu g/m^3$ |
| Sample 3 (15 sec) | 487 $\mu g/m^3$ | 38 $\mu g/m^3$ |
| Sample 4 (16 sec) | >500 $\mu g/m^3$ | 59 $\mu g/m^3$ |
| Sample 5 (23 sec) | 319 $\mu g/m^3$ | 158 $\mu g/m^3$ |
| Sample 6 (29 sec) | 185 $\mu g/m^3$ | 127 $\mu g/m^3$ |
| Sample 7 (30 sec) | 171 $\mu g/m^3$ | 119 $\mu g/m^3$ |

The PIXY with oil powder showed significantly less air pollution than PIXY alone.

Another experiment measured the air quality during a simulated seed application process whereby the dry lubricant is dispensed into a tumbling drum of seed with an augur that meters the powder onto the seed. The augur was manufactured by Changing Times of Watertown S. Dak. Batch A was the commercially available PIXY product (finely ground mica coated with titanium dioxide). Batch B was the commercially available PIXY product mixed with oil powder where the oil powder consisted of 60% soybean oil and 40% maltodextrin. Air quality was measured before the augur was activated and then again at regular intervals.

| Air Quality Sample | Batch A (PIXY) | Batch B (PIXY with oil powder) |
|---|---|---|
| Initial Sample | 111 $\mu g/m^3$ | 25 $\mu g/m^3$ |
| 5 seconds | 164 $\mu g/m^3$ | 25 $\mu g/m^3$ |
| 8 seconds | 487 $\mu g/m^3$ | 25 $\mu g/m^3$ |

The composition with the oil powder did not demonstrate any increase in air pollution while the commercially available product more than quadrupled the air pollution level.

While formulations with higher levels of oil-powder-to-seed-lubricant exhibit good fugitive dust controlling performance, there is a point at which the seed lubricant performance begins to diminish, even when applications rates of the seed lubricant are equalized in both formulations.

The seed flow rate was measured for three different compositions and one control.

| Treatment # | Treatment | Description | Application Rate | Seed Flow Rate (grams/second) | Seed Flow % of Standard |
|---|---|---|---|---|---|
| 1.0 | PIXY (Standard) | Commercial Powdered Seed Lubricant | 0.50 oz/ 100 lbs of seed | 13.8 | 100.0% |

-continued

| Treatment # | Treatment | Description | Application Rate | Seed Flow Rate (grams/second) | Seed Flow % of Standard |
|---|---|---|---|---|---|
| 1.1 | TEST 1 | 50% PIXY w/w blended with 50% Oil Powder (40% soybean oil) | 1.00 oz/ 100 lbs of seed | 14.6 | 105.8% |
| 1.2 | TEST 2 | 50% PIXY w/w blended with 50% Oil Powder (60% soybean oil) | 1.00 oz/ 100 lbs of seed | 12.8 | 92.8% |
| 1.3 | TEST 3 | 66.7% PIXY w/w blended with 33.3% Oil Powder (60% soybean oil) | 0.75 oz/ 100 lbs of seed | 14.5 | 105.1% |

At a point, too much oil powder negatively affects the seed flow rate.

In addition to testing with PIXY branded seed lubricant, additional testing with other commercial brands and different types of seed lubricants confirmed the dust controlling performance of the oil powders used with a wide range of specialty coated mica seed lubricants (e.g., E-007 SAT DRY Seed Finisher).

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

While the present general inventive concept has been fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in seeds, ratios of active ingredients, etc.

It is also to be understood that the following claims are intended to cover all of the generic and specific features of the invention herein described, and all statements of the scope of the invention which, as a matter of language, might be said to fall there between. Hence, the proper scope of the present general inventive concept should be determined only by the broadest interpretation of the appended claims so as to encompass all such modifications as well as all relationships described in the specification. It should also be understood that multiple combinations of dependent claims are also cumulatively and independently disclosed.

Finally, it will be appreciated that the purpose of the annexed Abstract is to enable the U.S. Patent and Trademark Office and the public generally, and especially the scientists, chemist, and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

The invention claimed is:

1. A composition for minimizing fugitive dust during seed treatment comprising (a) mica coated with titanium dioxide and (b) oil powder comprising oil and maltodextrin, wherein said mica coated with titanium dioxide is about 75% by weight and said oil powder is about 25% by weight of said composition.

2. The composition of claim 1 wherein said mica is finely ground.

3. The composition of claim 2 wherein said finely ground mica has a particle size of about 10-60 microns.

4. The composition of claim 1 wherein said mica coated with titanium dioxide comprises about 50%-75% by weight mica and 25%-50% by weight titanium dioxide.

5. The composition of claim 1 wherein said oil is comprised of soybean oil.

6. The composition of claim 5 wherein said soybean oil comprises about 60% by weight and said maltodextrin comprises about 40% by weight of said oil powder.

7. The composition of claim 1 wherein said composition further comprises a flow agent.

8. The composition of claim 7 wherein said flow agent is amorphous silica.

9. The composition of claim 7 wherein said flow agent is about 2% by weight of said composition.

10. The composition of claim 1 wherein said oil powder is produced in the absence of added heat.

11. The composition of claim 1 wherein said oil powder is not spray dried.

12. A method of dispensing a composition for minimizing fugitive dust comprising:
   (a) providing a mixture of (i) mica coated with titanium dioxide and (ii) oil powder comprising oil and maltodextrin, wherein said mica coated with titanium dioxide is about 75% by weight and said oil powder is about 25% by weight of said composition; and
   (b) dispensing said mixture into a seed application apparatus;
   wherein fugitive dust caused by said dispensing measures less than 500 µg/m$^3$.

13. The method of claim 12 further comprising the step of providing seeds into the application apparatus.

14. The method of claim 13 further comprising the step of treating said seeds with pesticides, nutrients, or plant growth promoters.

15. The method of claim 14 wherein said seeds are treated before said dispensing step.

16. The methods of claim 12 wherein said fugitive dust measures less than 100 µg/m$^3$.

17. The methods of claim 12 wherein said fugitive dust measures less than 50 µg/m$^3$.

18. The methods of claim 13 wherein said mixture is provided at a rate of about 0.7 ounces per 100 pounds of seed.

19. A composition for minimizing fugitive dust during seed treatment comprising (a) mica coated with titanium dioxide and (b) oil powder comprising oil and maltodextrin, wherein said mica coated with titanium dioxide is about 79% by weight and said oil powder is about 18% by weight of said composition.

* * * * *